(12) United States Patent
Nishimine et al.

(10) Patent No.: US 8,088,039 B2
(45) Date of Patent: Jan. 3, 2012

(54) HYDRAULIC CONTROL APPARATUS FOR VEHICLE AUTOMATIC TRANSMISSION

(75) Inventors: Akiko Nishimine, Toyota (JP); Hideki Miyata, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 201 days.

(21) Appl. No.: 12/652,284

(22) Filed: Jan. 5, 2010

(65) Prior Publication Data
US 2010/0210416 A1 Aug. 19, 2010

(30) Foreign Application Priority Data
Feb. 13, 2009 (JP) .................................. 2009-031702

(51) Int. Cl.
*F16H 61/26* (2006.01)
(52) U.S. Cl. ...................................................... 477/131
(58) Field of Classification Search .................. 477/127, 477/128, 130, 131, 906
See application file for complete search history.

(56) References Cited

U.S. PATENT DOCUMENTS

| | | | |
|---|---|---|---|
| 4,829,853 A * | 5/1989 | Sakaguchi | 477/114 |
| 6,755,486 B2 * | 6/2004 | Nishio et al. | 303/114.3 |
| 7,261,674 B2 | 8/2007 | Morise et al. | |
| 2009/0280953 A1 | 11/2009 | Nishimine et al. | |

FOREIGN PATENT DOCUMENTS

| | | |
|---|---|---|
| JP | 01172670 A | 7/1989 |
| JP | 2002021992 A | 1/2002 |
| JP | 2003056683 A | 2/2003 |
| JP | 2004076926 A | 3/2004 |
| JP | 2005273879 A | 10/2005 |
| JP | 2007032809 A | 2/2007 |
| JP | 2008144941 A | 6/2008 |

\* cited by examiner

*Primary Examiner* — Justin Holmes
(74) *Attorney, Agent, or Firm* — Gifford, Krass, Sprinkle, Anderson & Citkowski, P.C.

(57) ABSTRACT

In a hydraulic control apparatus for a vehicle automatic transmission, a check valve is provided parallel to a first oil passageway switching valve and a third oil passageway switching valve between an output port of a linear solenoid valve and a brake, and the check valve permits pressure oil to flow from the brake to the output port side, and blocks the flow thereof in the opposite direction. Therefore, the pressure oil from the brake when the brake is released is supplied to the output port via the check valve, not via the first or third oil passageway switching valve. Therefore, when the brake is released, the engaging pressure of the brake can be controlled by the linear solenoid valve, and the positions of the first and third oil passageway switching valves are not restricted.

8 Claims, 8 Drawing Sheets

|  | C1 | C2 | B1 | B2 | B3 | F1 |
|---|---|---|---|---|---|---|
| 1st | O |  |  | ◎ |  | △ |
| 2nd | O |  | O |  |  |  |
| 3rd | O |  |  |  | O |  |
| 4th | O | O |  |  |  |  |
| 5th |  | O |  |  | O |  |
| 6th |  | O | O |  |  |  |
| R |  |  |  | O | O |  |
| N |  |  |  |  |  |  |

◎ OPERATED DURING ENGINE BRAKING
△ OPERATED ONLY DURING BRAKING

HYDRAULIC CONTROL APPARATUS FOR VEHICLE AUTOMATIC TRANSMISSION

INCORPORATION BY REFERENCE

The disclosure of Japanese Patent Application No. 2009-031702 filed on Feb. 13, 2009 including the specification, drawings and abstract is incorporated herein by reference in its entirety.

BACKGROUND OF THE INVENTION

1. Field of the Invention

The invention relates to a hydraulic control apparatus that switches speed change steps of a vehicle automatic transmission.

2. Description of the Related Art

There have been proposed various hydraulic control apparatuses that switch speed change steps of an automatic transmission that constitutes a portion of a power transmission path of a vehicle, by releasing or engaging engagement elements of the automatic transmission. An example of such hydraulic control apparatuses is a hydraulic control apparatus for a vehicle automatic transmission that is disclosed in Japanese Patent Application Publication No. 2004-76926 (JP-A-2004-76926). The vehicle automatic transmission described in the publication No. 2004-76926 includes a first clutch as one of the aforementioned engagement elements. In order to hydraulically control the release or engagement of the first clutch, the hydraulic control apparatus is equipped with a D-range pressure channel that is supplied with a predetermined D-range pressure when a selector device is operated to a forward-travel position, as well as with a check valve, and a pressure control valve capable of continuously changing the oil pressure at its output port.

The output port of the pressure control valve is connected to the first clutch, and an input port of the pressure control valve is connected to the D-range pressure channel. Besides, the check valve is provided parallel to the pressure control valve, between the first clutch and the D-range pressure channel. While allowing pressure oil to flow from the first clutch into the D-range pressure channel, the check valve blocks the pressure oil to flow in the opposite direction.

Due to this construction, the hydraulic control apparatus is able to quickly discharge the pressure oil from the first clutch via the check valve, for example, when the selector device is operated from the forward-travel position to another position while the first clutch is in an engaged state.

On the basis of the hydraulic control apparatus shown in the publication No. 2004-76926, a construction is assumed in which the pressure control valve is replaced with a switching valve that is capable of blocking the engagement oil pressure of the first clutch for fail-safety. In that case, the input port of the switching valve is supplied with a regulated engagement oil pressure. In this construction, since the check valve is provided parallel to the switching valve so as to permit the discharge of the pressure oil from the first clutch, the pressure oil of the first clutch is discharged via the check valve at the time of release of the first clutch, and the position of the switching valve is not constrained. However, the pressure oil is discharged, via the check valve, directly to the D-range pressure channel whose pressure is made equal to a drain pressure. Therefore, there is a problem of not being able to control the oil pressure at the time of release of the first clutch (engagement element) through the use of the pressure control valve. Therefore, at the time of release of the first clutch, there is a risk of the releasing operation of the engagement element becoming instantaneous and therefore the shift shock becoming large. Incidentally, this problem is not known to public.

SUMMARY OF THE INVENTION

The invention provides a hydraulic control apparatus for a vehicle automatic transmission that changes the speed change step by engaging or releasing engagement elements, the hydraulic control apparatus being capable of releasing an engagement element when it needs to be released, by controlling the engagement oil pressure of the engagement element without restricting the position of a switching valve provided between a hydraulic control valve and that engagement element.

According to an aspect of the invention, a hydraulic control apparatus (a) for a vehicle automatic transmission that includes a first engagement element and a second engagement element that are released or engaged through hydraulic control in order to switch speed change steps (b) includes: an engagement pressure regulating valve whose input port is supplied with engagement basic pressure for engaging the first engagement element, and which continuously changes oil pressure of an output port of the engagement pressure regulating valve; a first oil passageway switching valve that is selectively switched between a first position in which the first oil passageway switching valve connects the output port of the engagement pressure regulating valve and the first engagement element to each other, and disconnects the second engagement element and an oil pressure supply passageway to the second engagement element from each other, and a second position in which the first oil passageway switching valve disconnects the output port of the engagement pressure regulating valve and the first engagement element from each other, and interconnects the second engagement element and the oil pressure supply passageway; and a check valve that is provided parallel to the first oil passageway switching valve, between the output port of the engagement pressure regulating valve and the first engagement element, and that permits pressure oil to flow in a direction from a side of the first engagement element to a side of the output port, and prevents the pressure oil from flowing in a direction opposite to the direction from the side of the first engagement element to the side of the output port. (c) The first oil passageway switching valve is switched to the first position when the first engagement element is engaged and the second engagement element is released.

Therefore, when the first engagement element is released, the releasing operation of the first engagement element can be realized by controlling the oil pressure of the first engagement element through the use of the engagement pressure regulating valve, without restricting the position of the first oil passageway switching valve, that is, regardless of whether the first oil passageway switching valve has been switched to the first position or the second position. Hence, the gear shift shock can be restrained in comparison with the case where the oil pressure of the first engagement element is immediately changed to the drain pressure. Besides, when the first oil passageway switching valve is in the first position, the first engagement element can be engaged by the oil pressure from the engagement pressure regulating valve, while the second engagement element cannot be engaged by the oil pressure from the oil pressure supply passageway. On the other hand, when the first oil passageway switching valve is in the second position, the first engagement element cannot be engaged by the oil pressure from the engagement pressure regulating valve, while the second engagement element can be engaged by the oil pressure from the oil pressure supply passageway.

Due to this construction of the first oil passageway switching valve, the simultaneous engagement of both the first engagement element and the second engagement element as a result of a failure of the vehicle automatic transmission or the like can be prevented. Incidentally, the first oil passageway switching valve is switched to the first position in the case where the first engagement element is engaged and the second engagement element is released, as described above. However, this does not necessarily mean to exclude an operation where the second engagement element is engaged when the first oil passageway switching valve is in the first position. For example, it is possible to conceive a case where, when the first oil passageway switching valve is in the first position, the second engagement element is engaged because the second engagement element is supplied with oil pressure from an oil passage that is other than the oil pressure supply passageway that is disconnected from the second engagement element when the first oil passageway switching valve is in the first position.

In the foregoing hydraulic control apparatus, (a) the engagement pressure regulating valve may disconnect the output port and the input port from each other and may interconnect the output port and a drain port of the engagement pressure regulating valve when the engagement pressure regulating valve is not operated, and (b) the hydraulic control apparatus may be provided with a second oil passageway switching valve that selectively switches oil pressure acting at the drain port between the engagement basic pressure and a drain pressure at which the first engagement element is released, and (c) when the vehicle automatic transmission fails, the first oil passageway switching valve may be switched to the first position, and the oil pressure at the drain port may be made equal to the engagement basic pressure by the second oil passageway switching valve, so that the first engagement element is engaged, and (d) the second oil passageway switching valve may cause the oil pressure acting at the drain port to be equal to the engagement basic pressure when the first engagement element is engaged while the first oil passageway switching valve has been switched to the second position. In this manner, the oil pressure of the output port becomes equal to the engagement basic pressure, regardless of the state of operation of the engagement pressure regulating valve, so that the pressure oil causing the engagement of the first engagement element is prevented from being discharged via the check valve, and therefore decline of the engaging force of the first engagement element can be prevented. Besides, since the second oil passageway switching valve is essentially needed for fail-safety, it is not necessary to newly provide a switching valve for the purpose of preventing an incident in which the pressure oil causing the engagement of the first engagement element is discharged via the check valve. In addition, the failure of the vehicle automatic transmission means, for example, that the vehicle automatic transmission becomes unable to shift the gear speed according to the driver's intention, or the like, concretely, an all-solenoid break state in which all the electromagnetic-type engagement pressure regulating valves provided for carrying out the gear ratio shift control of the automatic transmission become impossible to excite. Besides, the aforementioned time of non-operation of the engagement pressure regulating valve refers to the time of non-electrification (non-excitation) if the engagement pressure regulating valve is a solenoid valve, or refers to a case where the pilot pressure is zero if the engagement pressure regulating valve is a pressure control valve that changes the oil pressure of its output port according to the pilot pressure.

Besides, (a) the vehicle automatic transmission may include a third engagement element that is released or engaged by an oil pressure control in order to switch the speed change steps, and may establish a speed change step for forward travel when both the first engagement element and the third engagement element are engaged, (b) at a time of failure of the vehicle automatic transmission, the second oil passageway switching valve may supply the third engagement element with a D-range pressure that becomes equal to the engagement basic pressure when a selector device is operated to a forward-travel position, while the second oil passageway switching valve is in the position that causes the oil pressure acting at the drain port to be equal to the engagement basic pressure. With this construction, when the vehicle automatic transmission fails, the foregoing speed change step is established as the selector device is operated to a forward-travel position. Therefore, even if the gear shift of the automatic transmission that is performed at the time of non-failure, that is, at the time of normality, becomes impossible, the vehicle is still able to travel forward.

Besides, the engagement pressure regulating valve may interconnect the output port and the input port when the first engagement element is engaged while the first oil passageway switching valve has been switched to the second position. With this construction, the oil pressure of the output port becomes equal to the engagement basic pressure, so that the pressure oil causing the engagement of the first engagement element can be prevented from being discharged via the check valve, and therefore decline of the engaging force of the first engagement element can be prevented. Besides, since the operation of the engagement pressure regulating valve, and an operation in which the oil pressure acting at the drain port is made equal to the engagement basic pressure by the second oil passageway switching valve are both carried out, the decline of the engaging force of the first engagement element can be more sufficiently prevented.

Besides, (a) the vehicle automatic transmission may establish a predetermined speed change step for forward travel when the first engagement element is engaged and the second engagement element is released, and may establish a reverse-travel speed change step when both the first engagement element and the second engagement element are engaged, and (b) the first oil passageway switching valve may be switched to the first position when the speed change step of the vehicle automatic transmission is a forward-travel speed change step. Due to this construction, the speed change step of the automatic transmission changing to the reverse-travel speed change step due to a failure of the automatic transmission or the like can be mechanically prevented by the first oil passageway switching valve.

Besides, the first oil passageway switching valve, when in the second position, may supply the first engagement element with a reverse-travel range pressure that becomes equal to the engagement basic pressure when a selector device is operated to a reverse-travel position. Therefore, in the case where the selector device is operated to the reverse-travel position, the second engagement element is engaged by the oil pressure from the oil pressure supply passageway, and simultaneously the first engagement element is engaged due to the supply of the reverse-travel range pressure, whereby the reverse-travel speed change step is achieved.

Besides, (a) a third oil passageway switching valve that supplies the first engagement element selectively with the oil pressure from the first oil passageway switching valve or a reverse-travel range pressure that becomes equal to the engagement basic pressure when a selector device is operated to a reverse-travel position may be provided between the first engagement element and the first oil passageway switching valve, and (b) the third oil passageway switching valve may supply the reverse-travel range pressure to the first engagement element when the speed change step of the vehicle automatic transmission is the reverse-travel speed change step. Therefore, in the case where the selector device is operated to the reverse-travel position, the first engagement element is engaged due to the supply of the reverse-travel range pressure. Furthermore, the first oil passageway switching valve, when in the second position, interconnects the second engagement element and the oil pressure supply passageway, and therefore the oil pressure from the oil pressure supply passageway engages the second engagement element, whereby the reverse-travel speed change step is achieved. Besides, the first oil passageway switching valve, when in the first position, supplies the second engagement element with the reverse-travel range pressure. Therefore, it becomes possible to construct a hydraulic control circuit capable of achieving the reverse-travel speed change step as the first engagement element and the second engagement element are supplied with the reverse-travel range pressure, and therefore are both engaged even when the first oil passageway switching valve is in the first position in the case where the selector device is operated to the reverse-travel position.

Besides, the engagement pressure regulating valve may be a linear solenoid valve. This makes it possible to directly control the engagement oil pressure of the first engagement element in an electric manner.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Embodiments of the invention will be described in detail hereinafter with reference to the drawings.

Figures 1, 2:
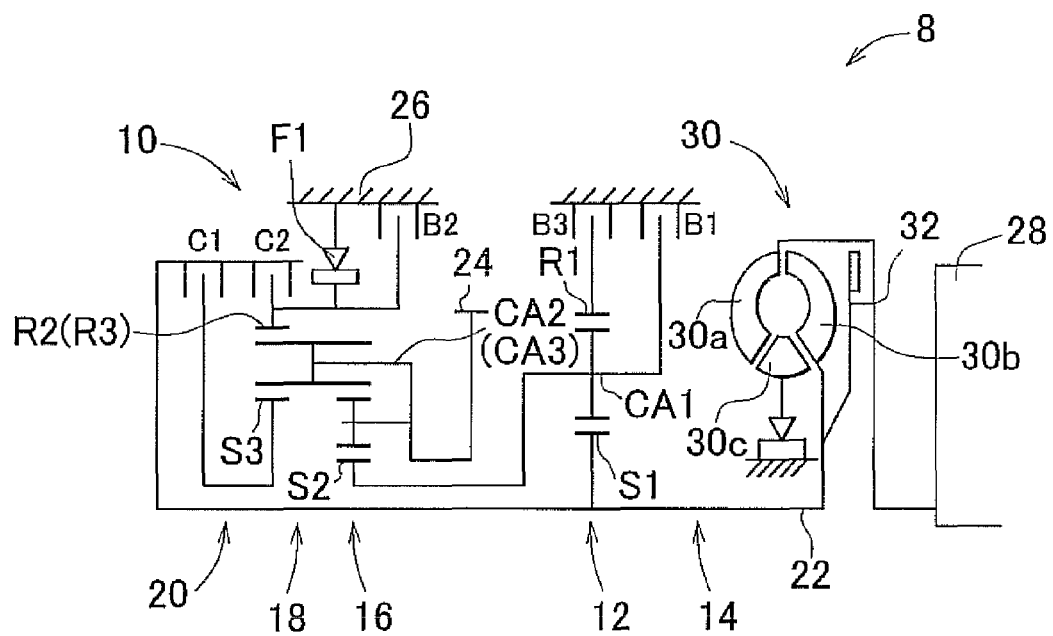
FIG. 1 is a skeleton diagram of a power transmission apparatus that is controlled by a hydraulic control apparatus to which the invention is applied.
FIG. 2 is an operation table illustrating the states of operation of engagement elements for establishing a plurality of speed change steps (gear steps) in a vehicle automatic transmission that is provided in the power transmission apparatus shown in FIG. 1.

FIG. 1 is a skeleton diagram of a power transmission apparatus 8 that is controlled by a hydraulic control apparatus 100 (see FIG. 4) to which the invention is applied. FIG. 2 is an operation table illustrating the states of operation of engagement elements for establishing a plurality of speed change steps (gear steps) in a vehicle automatic transmission 10 (hereinafter, simply referred to as "automatic transmission 10") that is provided in the power transmission apparatus 8. This automatic transmission 10 is used in an FF-type vehicle in which the automatic transmission is mounted in a left-right direction of the vehicle (transversely mounted). The automatic transmission 10 has a first gear ratio shift portion 14 that is constructed mainly of a single-pinion type first planetary gear device 12, and a second gear ratio shift portion 20 that is constructed in a Ravigneaux form mainly of a double-pinion type second planetary gear device 16 and a single-pinion type third planetary gear device 18. The first gear ratio shift portion 14 and the second gear ratio shift portion 20 are on the same axis. In the automatic transmission 10, the rotation of the input shaft 22 is changed in speed, and then is output from an output rotating member 24. The input shaft 22 corresponds to an input member, and, in this embodiment, is a turbine shaft of a torque converter 30 that is rotationally driven by an engine 28 that is a motive power source for moving the vehicle. Besides, the output rotating member 24 corresponds to an output member of the automatic transmission 10, and functions as an output gear that meshes with a differential driven gear (large-diameter wheel) 36, that is, functions as a differential drive gear, so as to transmit power to a differential gear device 34 shown in FIG. 4. The output of the engine 28 is transmitted to a pair of driving wheels (front wheels) 40 via the torque converter 30, the automatic transmission 10, the differential gear device 34, and a pair of axle shafts 38. Incidentally, this automatic transmission 10 is constructed so as to be substantially symmetrical about a center line, and a lower half thereof below the center line in FIG. 1 is omitted from the illustration.

The engine 28 is an internal combustion engine, such as a gasoline engine or the like, which generates drive force through combustion of a fuel that is injected into the cylinders of the engine 28. Besides, the torque converter 30 is a fluid transmission device that includes a pump impeller 30a linked to a crankshaft of the engine 28, a turbine impeller 30b linked to the input shaft 22 of the automatic transmission 10, and a stator impeller 30c linked to a housing (transmission case) 26 of the automatic transmission 10 via a one-way clutch, and that transmits the power generated by the engine 28 to the automatic transmission 10 via a fluid. A lockup clutch 32, that is, a direct coupling clutch, is provided between the pump impeller 30a and the turbine impeller 30b, and is constructed so as to assume an engaged state, a slip state, or a released state due to a hydraulic control or the like. When the lockup clutch 32 is completely engaged, the pump impeller 30a and the turbine impeller 30b are rotated integrally as one unit.

The operation table in FIG. 2 summarizes relations between the speed change steps established by the automatic transmission 10 and the states of operation of clutches C1 and C2, and brakes B1, B2 and B3. In the table, "O" represents the engagement, and "Θ" represents the engagement only at the time of engine braking, and a blank represents the release. The clutches C1 and C2, and the brakes B1, B2 and B3 (hereinafter, referred to simply as "clutches C", and "brakes B", when not particularly distinguished) that are provided in the automatic transmission 10 are engagement elements that are released or engaged by the hydraulic control so as to switch the speed change step of the automatic transmission 10. Concretely, each of the clutches C and the brakes B is a hydraulic type friction engagement device whose engagement is controlled by a hydraulic actuator such as a multi-plate clutch or brake, or the like. The clutches C and the brakes B are switched between the engaged and released states, and the transitional pressures at the time of engagement or release thereof, etc., are controlled as the switching of a hydraulic circuit by a manual valve that operates in coordination with the excitation, the non-excitation, or the electric current control of linear solenoids SL1 to SL4 of the hydraulic control circuit 98 (see FIG. 4), or with the operation of the selector device 46.

In the automatic transmission 10, six forward-travel speed change steps, that is, the first speed change step (first-speed gear step) "1st" to the sixth speed change step (sixth-speed gear step) "6th" are established, and one reverse-travel speed change step, that is the reverse-travel speed change step "R", is established, according to combinations of the states of coupling of the rotating elements (the sun gears S1 to S3, the carriers CA1 to CA3, the ring gears R1 to R3) of the first gear ratio shift portion 14 and the second gear ratio shift portion 20. As shown in FIG. 2, for example, with regard to the forward-travel gear steps, the first-speed gear step "1st" is established by the engagement of the clutch C1 and the engagement of the brake B2, and the second-speed gear step "2nd" is established by the engagement of the clutch C1 and the engagement of the brake B1, and the third-speed gear step "3rd" is established by the engagement of the clutch C1 and the engagement of the brake B3, and the fourth-speed gear step "4th" is established by the engagement of the clutch C1 and the engagement of the clutch C2, and the fifth-speed gear step "5th" is established by the engagement of the clutch C2 and the engagement of the brake B3, and the sixth-speed gear step "6th" is established by the engagement of the clutch C2 and the engagement of the brake B1. Besides, the reverse travel gear step "Rev" is established by the engagement of the brake B2 and the brake B3, and the neutral state come about when the clutches C and the brakes B are all released. In the automatic transmission 10 of this embodiment, since the brake B2 for establishing the first speed change step "1st" is provided with the one-way clutch F1 in parallel, the brake B2 does need to be engaged when the vehicle starts off (or accelerates). Besides, the speed change ratio of each speed change step is appropriately determined by the gear ratios (=the number of teeth of the sun gear/the number of teeth of the ring gear) ρ1, ρ2 and ρ3 of the first planetary gear device 12, the second planetary gear device 16, and the third planetary gear device 18. Incidentally, it may be considered that the brake B3 corresponds to a first engagement element in the invention, and the brake B2 corresponds to a second engagement element in the invention, and the clutch C1 corresponds to a third engagement element in the invention. Besides, it may also be considered that the third-speed gear step "3rd" corresponds to a speed change step for forward travel in the invention, and the third-speed gear step "3rd" and the fifth-speed gear step "5th" correspond to a predetermined speed change step for forward travel in the invention. Specifically the automatic transmission 10 achieves the third-speed gear step "3rd", a speed change step for forward travel, when the brake B3, that is, the first engagement element, and the clutch C1, that is, the third engagement element, are both engaged. Then, the automatic transmission 10 achieves one of the third-speed gear step "3rd" and the fifth-speed gear step "5th", that is, a predetermined speed change step for forward travel, when the brake B3, that is, the first engagement element, is engaged and the brake B2, that is, the second engagement element, is released. When both the first engagement element and the second engagement element are engaged, the reverse-travel speed change step "R" is achieved.

Figure 3:
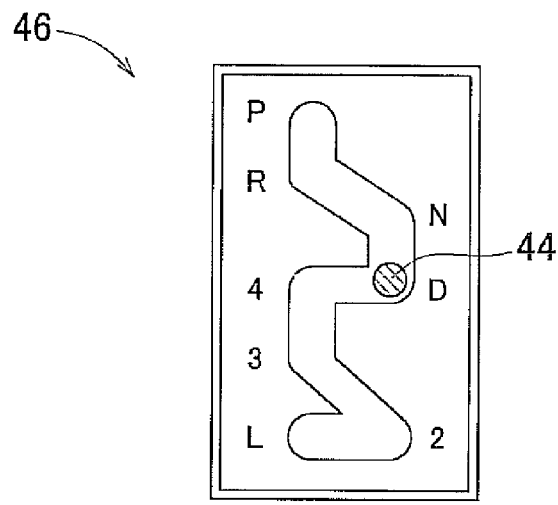
FIG. 3 is a diagram illustrating a selector device for commanding a gear shift of the vehicle automatic transmission that is provided in the power transmission apparatus shown in FIG. 1.

FIG. 3 is a diagram illustrating the selector device 46 that has a selection lever 44. The selector device 46 is disposed, for example, at a side of the driver's seat. The selection lever 44 of the selector device 46 is provided so as to be operable to a parking position "P" for locking the output rotating member 24 of the automatic transmission 10, a reverse-travel position "R" for reverse travel of the vehicle, a neutral position "N" for bringing about a neutral state in which the power transmission path in the automatic transmission 10 is interrupted, a forward-travel position "D" (highest speed range position) for allowing the automatic shifting over the range of the first to sixth-speed gear steps in an automatic shift mode, a fourth engine-brake travel position "4" for allowing the automatic shifting in the range of the first to fourth-speed gear steps and activating the engine brake at each of the gear steps, a third engine-brake travel position "3" for allowing the automatic shifting in the range of the first to third-speed gear steps and for activating the engine brake at each of the gear steps, a second engine-brake travel position "2" for allowing the automatic shifting in the range of the first and second-speed gear steps and activating the engine brake at each of the gear steps, and a first engine-brake travel position "L" for causing the vehicle to travel at the first-speed gear step and activating the engine brake. At the parking position "P", the driving wheels 40 are mechanically prevented from rotating by a mechanical parking mechanism (not shown). Incidentally, it may also be considered that the forward-travel position "D", the fourth engine-brake travel position "4", the third engine-brake travel position "3", the second engine-brake travel position "2", and the first engine-brake travel position "L" for the forward travel of the vehicle correspond to a forward-travel position in the invention, and the reverse-travel position "R" corresponds to a reverse-travel position in the invention.

Figure 4:
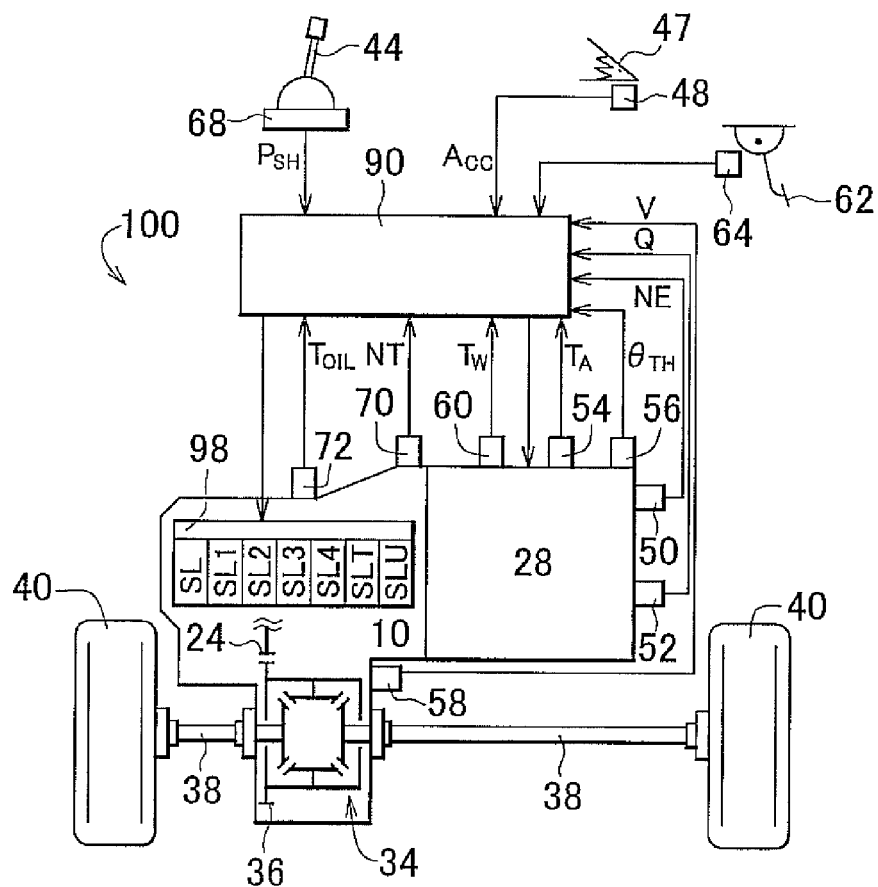
FIG. 4 is a block diagram illustrating a electrical control system of an electronic control unit that is provided in a vehicle so as to control the power transmission apparatus or the like shown in FIG. 1.

FIG. 4 is a block diagram illustrating an electric control system of an electronic control unit 90 that is provided in a vehicle in order to control the power transmission apparatus 8, and the like. The electronic control unit 90 shown in FIG. 4 is, for example, a so-called microcomputer that includes a ROM, a RAM, a CPU, an input/output interface, etc. The CPU executes various controls and the like regarding the power transmission apparatus 8, by processing input signals according to programs pre-stored in the ROM while utilizing the temporary storage function of the RAM. Besides, the amount of operation ACC of an accelerator pedal 47 is detected by an accelerator operation amount sensor 48, and a signal representing the accelerator operation amount ACC is supplied to the electronic control unit 90. The accelerator pedal 47 is depressed according to the driver's requested output amount, and corresponds to an accelerator operating member. The accelerator operation amount Acc may be considered to correspond to the requested output amount. Besides, there are provided: an engine rotation speed sensor 50 for detecting the rotation speed NE of the engine 28, an intake air amount sensor 52 for detecting the intake air amount Q of the engine 28; an intake air temperature sensor 54 for detecting the temperature TA of intake air; an idle switch-equipped throttle sensor 56 for detecting the fully closed state (idle state) of an electronic throttle valve of the engine 28 and also detecting the degree of opening θTH of the electronic throttle valve; a vehicle speed sensor 58 for detecting the vehicle speed V (corresponding to the rotation speed NOUT of the output rotating member 24); a cooling water temperature sensor 60 for detecting the cooling water temperature TW of the engine 28; a brake switch 64 for detecting the presence/absence of operation of a foot brake pedal 62, that is, a service brake; a lever position sensor 68 for detecting the lever position (operating position) PSH of the selection lever 44; a turbine rotation speed sensor 70 for detecting the turbine rotation speed NT (=the rotation speed NIN of the input shaft 22); an automatic transmission fluid temperature sensor 72 for detecting the automatic transmission fluid temperature TOIL that is the temperature of the working fluid in the hydraulic control circuit 98; etc. From these sensors or switches, various signals representing the engine rotation speed NE, the intake air amount Q, the intake air temperature TA, the throttle valve opening degree θTH, the vehicle speed V, the engine cooling water temperature TW, the presence/absence of brake operation, the lever position PSH of the selection lever 44, the turbine rotation speed NT, the automatic transmission fluid temperature TOIL, etc., are supplied to the electronic control unit 90.

Besides, the electronic control unit 90 executes, as basic controls, for example, a throttle opening degree control of controlling the throttle valve opening degree θTH (%) on the basis of the actual accelerator operation amount ACC (%) from a pre-stored relation, a gear ratio shift control of automatically switching the gear step of the automatic transmission 10 on the basis of the actual accelerator operation amount ACC (%) or the throttle valve opening degree θTH and the vehicle speed V (km/h) from a pre-stored relation, a feedback control and a learning control regarding the gear ratio shift control, a control of executing the engagement, release or slipping of the lockup clutch 32 provided on the torque converter 30 on the basis of the output shaft rotation speed (vehicle speed) NOUT, and the throttle valve opening degree θTH, from a pre-stored relation, etc.

Besides, the electronic control unit 90 controls the states of excitation of linear solenoid valves SL1 to SL4, SLU and SLT, and an electromagnetic switching valve SL of the hydraulic control circuit 98, that is, continuously changes the engagement oil pressures PC1, PC2, PB1, PB2 and PB3 of the clutches C and the brakes B, and therefore controls the engraining operation and the releasing operation of the clutches C and the brakes B, according to the operating position of the selection lever 44 so that a gear shift shock, such as a change in drive force, etc., will not occur, or the durability of friction members of the friction engagement devices (the clutches C and the brakes B) will not be impaired. As is apparent from the table of FIG. 2, the automatic transmission 10 of this embodiment is constructed so that each gear step is achieved by engagement of two engagement elements, and the shifting between adjacent gear steps is performed in a clutch-to-clutch shift manner in which a clutch C or a brake B of the two engaged engagement elements is released, while the other one of the engagement elements is kept engaged and another engagement element is caused to be engaged.

Figure 5:
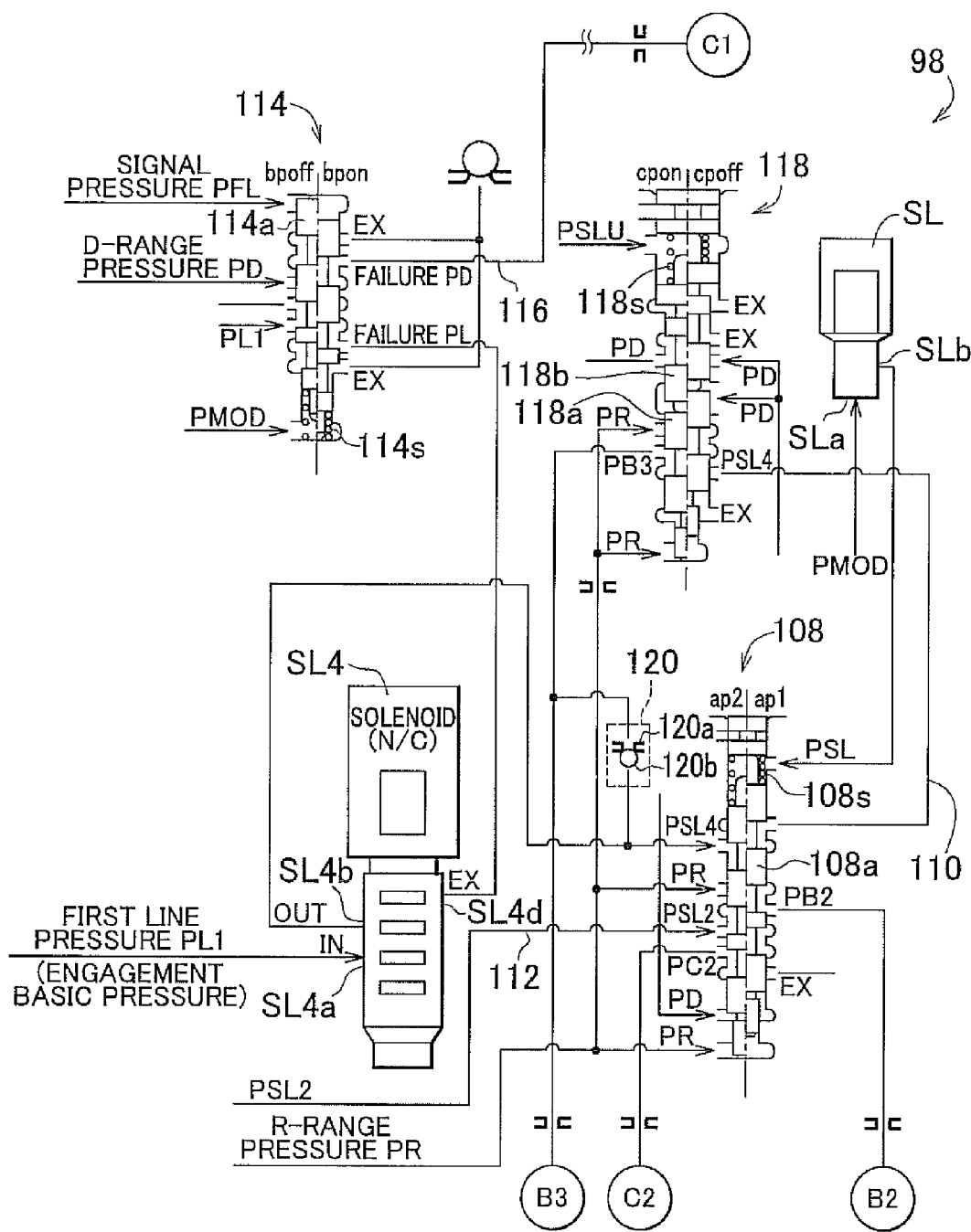
FIG. 5 is a circuit diagram illustrating portions of the hydraulic control circuit shown in FIG. 4, that is, portions involved in the engaging operation and the release operation of the brake B3 provided in the vehicle automatic transmission.

FIG. 5 is a circuit diagram illustrating portions of the hydraulic control circuit 98, that is, portions thereof concerned with the engaging operation and the releasing operation of the brake B3. The hydraulic control circuit 98 and the electronic control unit 90 constitute a hydraulic control apparatus 100 of the automatic transmission 10. Although FIG. 5 does not show the brake B1, it does not means that the hydraulic control circuit 98 does not include a hydraulic control circuit of the brake B1.

Linear solenoid valves SL1, SL2, SL3 and SL4 (see FIG. 4) are provided in the hydraulic control circuit 98, and the state of excitation of each linear solenoid SL is controlled in accordance with a drive signal (designated oil pressure) that is output from the electronic control unit 90. Due to the control of the states of excitation of these solenoid valves, the engagement oil pressures PC1, PC2, PB1, PB2 and PB3 of the clutches C1 and C2, and the brakes B1, B2 and B3 are controlled independently of each other, whereby the electronic control unit 90 is able to selectively establish each one of the first to sixth-speed gear steps "1st" to "6th" and the reverse travel gear step "Rev". Each of the linear solenoid valves SL1 to SL4 is of a large-capacity type, and their output oil pressures PSL1, PSL2, PSL3 and PSL4 are directly supplied to the clutches C1 and C2, and the brakes B1, B2 and B3, so as to perform a direct pressure control of directly controlling the engagement oil pressures PC1, PC2, PB1, PB2 and B3.

Of the linear solenoid valves SL1, SL2, SL3 and SL4, the linear solenoid valve SL4 shown in FIG. 5 will be concretely described. The linear solenoid valves SL1, SL2 and SL3 are not shown in FIG. 5. The linear solenoid valve SL4 may be considered to correspond to an engagement pressure regulating valve in the invention, and is a so-called normally closed (N/C) type linear solenoid valve. That is, the linear solenoid valve SL4, when in a non-operation state, that is, a non-electrified state (non-excited state), disconnects an output port SL4*b* thereof and an input port SL4*a* thereof from each other, and connects the output port SL4*b* and a drain port SL4*d* thereof to each other. The input port SL4*a* of the linear solenoid valve SL4 is supplied with a first line pressure PL1 as an engagement basic pressure for engaging the brake B3. Using this pressure, the linear solenoid valve SL4 continuously changes the oil pressure of the output port SL4*b* (output oil pressure PSL4) according to the drive current through the solenoid. Incidentally, the first line pressure PL1 is an oil pressure obtained by regulating the pressure of the working fluid pumped from an oil pump that is included in the hydraulic control circuit 98, by a relief-type first line pressure regulating valve that is included in the hydraulic control circuit 98. Besides, the foregoing oil pump is, for example, a mechanical pump that is rotationally driven by the engine 28. Besides, the foregoing first line pressure regulating valve performs the pressure regulating action according to a signal pressure PSLT that is supplied from the linear solenoid valve SLT (see FIG. 4). The signal pressure PSLT is changed according to the input torque of the automatic transmission 10, or the like.

The electromagnetic switching valve SL is an on-off switching valve that is provided in the hydraulic control circuit 98. An input port SLa of the valve SL is supplied with a modulator pressure PMOD. During a non-electrified state, that is, an off-state, the electromagnetic switching valve SL disconnects the input port SLa and an output port SLb thereof from each other. During an electrified state, that is, an on-state, the valve SL interconnects the input port SLa and the output port SLb. That is, the electromagnetic switching valve SL, during the on-state, gives the modulator pressure PMOD as an oil pressure of the output port SLb (output oil pressure PSL). During the off-state of the electromagnetic switching valve SL, for example, the output oil pressure PSL is brought to a drain pressure that is substantially equal to zero. In addition, the modulator pressure PMOD is a constant oil pressure provided by a modulator pressure regulating valve that is included in the hydraulic control circuit 98. Specifically, the regulating valve provides the modulator pressure PMOD by regulating the first line pressure PL1 as a basic pressure at a constant oil pressure despite the fluctuations of the basic pressure.

The first oil passageway switching valve 108 is a switching valve that is selectively switched between a first position ap1 and a second position ap2, and has a return spring 108s and a spool valve element 108a, and is provided in the hydraulic control circuit 98. The spool valve element 108a receives a downward (in FIG. 5) first thrust force that is a sum of an elastic force of the return spring 108s and a thrust force based on the output oil pressure PSL of the electromagnetic switching valve SL, and an upward (in FIG. 5) second thrust force that is a sum of a thrust force based on the D-range pressure PD and a thrust force based on the R-range pressure PR. The first downward thrust force and the second upward thrust force act in the directions along the axis of the spool element 108a. Therefore, the first oil passageway switching valve 108 is switched to the first position ap1 when the first thrust force is smaller than the second thrust force, that is, when the electromagnetic switching valve SL is in the off-state. On the other hand, when the first thrust force is greater than the second thrust force, that is, when the electromagnetic switching valve SL is in the on-state, the first oil passageway switching valve 108 is switched to the second position ap2.

The first oil passageway switching valve 108, when in the first position ap1, interconnects the output port SL4b of the linear solenoid valve SL4 and a first communication passageway 110, that is, connects the output port SL4b and the brake B3 via a third oil passageway switching valve 118. Furthermore, when in the first position ap1, the first oil passageway switching valve 108 disconnects the brake B2 and an oil pressure supply passageway 112 to the brake B2 from each other, and interconnects the brake B2 and a channel that is supplied with the R-range pressure PR. Besides, the first oil passageway switching valve 108, when in the second position ap2, disconnects the output port SL4b of the linear solenoid valve SL4 and the first communication passageway 110 from each other, that is, disconnects the output port SL4b and the brake B3 from each other. Furthermore, when in the second position ap2, the first oil passageway switching valve 108 disconnects the brake B2 and the channel that is supplied with the R-range pressure PR from each other, and interconnects the brake B2 and the oil pressure supply passageway 112, whereby the output oil pressure PSL2 of the linear solenoid valve SL2 is supplied to the brake B2. Incidentally, in this embodiment, the R-range pressure PR may be considered to be an oil pressure that corresponds to a reverse-travel range pressure in the invention. Due to the hydraulic circuit switching by the manual valve, the R-range pressure PR becomes equal to the first line pressure PL1 when the selector device 46 is operated to the reverse-travel position "R", and the R-range pressure PR becomes equal to the drain pressure that is substantially zero when the selector device 46 is at any one of the other positions "P", "N", "D", "4", "3", "2" and "L". Besides, the D-range pressure PD is an oil pressure which, due to the hydraulic circuit switching by the manual valve, becomes equal to the first line pressure PL1 when the selector device 46 is operated to the forward-travel position "D" or any one of the other operating positions "4", "3", "2" and "L" for the forward travel of the vehicle, that is, when the selector device 46 is operated to the foregoing forward-travel position, and which becomes equal to the drain pressure that is substantially zero, when the selector device 46 is at any of the other operating positions "P", "N" and "R".

A second oil passageway switching valve 114 is a switching valve that is selectively switched between an on-position bpon and an off-position bpoff according to a signal pressure PFL that is controlled by the electronic control unit 90. The second oil passageway switching valve 114 has a return spring 114s and a spool valve element 114a, and is provided in the hydraulic control circuit 98. The spool valve element 114a receives a downward (in FIG. 5) first thrust force that is a thrust force based on the signal pressure PFL, and an upward (in FIG. 5) second thrust force that is a sum of an elastic force of the return spring 114s and a thrust force based on the modulator pressure PMOD. The first downward thrust force and the second upward thrust force act on the spool valve element 114a in the directions of the axis of thereof. Therefore, the second oil passageway switching valve 114 is switched to the on-position bpon when the first thrust force is greater than the second thrust force, that is, when the signal pressure PFL is supplied. On the other hand, when the first thrust force is smaller than the second thrust force, that is, when the signal pressure PFL is not supplied, the second oil passageway switching valve 114 is switched to the off-position bpoff.

The second oil passageway switching valve 114, when in the on-position bpon, supplies the first line pressure PL1 to the drain port SL4d of the linear solenoid valve SL4, that is, causes the oil pressure acting at the drain port SL4d to be equal to the first line pressure PL1. Furthermore, when in the on-position bpon, the second oil passageway switching valve 114 supplies the D-range pressure PD to a second communication passageway 116 that connects to the clutch C1. On the other hand, when in the off-position bpoff, the second oil passageway switching valve 114 causes the oil pressure acting at the drain port SL4d to be equal to the substantially zero drain pressure at which the brake B3 is released, and also causes the oil pressure to the second communication passageway 116 to be equal to the drain pressure. That is, from the viewpoint of the oil pressure that acts on the drain port SL4d of the linear solenoid valve SL4, the second oil passageway switching valve 114 serves to selectively switch the oil pressure acting on the drain port SL4d between the first line pressure PL1 and the drain pressure, according to the signal pressure PFL. Incidentally, the second communication passageway 116 is connected to the clutch C1 in the case of failure of the automatic transmission 10. In the other cases, the second communication passageway 116 is disconnected from the clutch C1. The failure of the automatic transmission 10 means, for example, that it becomes impossible to carry out the gear ratio shift control of the automatic transmission 10 by the electronic control unit 90, concretely, an all-solenoid break state in which all the linear solenoid valves SL1 to SL4 provided for carrying out the gear ratio shift control of the automatic transmission 10 become impossible to excite.

The third oil passageway switching valve 118 is a switching valve that is selectively switched between an on-position cpon and an off-position cpoff according to a signal pressure PSLU from the linear solenoid valve SLU that is controlled by the electronic control unit 90. The third oil passageway switching valve 118 includes a spool valve element 118a, a spool plunger 118b, and a return spring 118s, and is provided in the hydraulic control circuit 98. The spool valve element 118a receives a downward first thrust force that is a sum of a thrust force based on the signal pressure PSLU and an elastic force of the return spring 118s, and an upward second thrust force that is a thrust force based on the R-range pressure PR. The first downward thrust force and the second upward thrust force act in the directions along the axis of the spool valve element 118a. Therefore, the third oil passageway switching valve 118 is switched to the on-position cpon when the first thrust force is greater than the second thrust force, that is, when the signal pressure PSLU is supplied. On the other hand, when the first thrust force is smaller than the second thrust force, that is, when the signal pressure PSLU is not supplied, the third oil passageway switching valve 118 is switched to the off-position cpoff. Incidentally, the spool valve element 118a also receives a downward thrust force based on D-range pressure PD, in addition to the first thrust force. Therefore, for example, when the D-range pressure PD is equal to the first line pressure PL1, the spool valve element 118a is switched to the on-position cpon even if the signal pressure PSLU is not supplied.

The third oil passageway switching valve 118 is provided between the brake B3 and the first oil passageway switching valve 108 in the hydraulic circuit. When in the on-position cpon, the third oil passageway switching valve 118 interconnects the first communication passageway 110 and the brake B3, and therefore supplies the oil pressure from the first oil passageway switching valve 108 to the brake B3. On the other hand, when in the off-position cpoff, the third oil passageway switching valve 118 disconnects the first communication passageway 110 and the brake B3 from each other, and supplies the R-range pressure PR to the brake B3. That is, the third oil passageway switching valve 118 selectively supplies the oil pressure from the first oil passageway switching valve 108 or the R-range pressure PR to the brake B3 according to the signal pressure PSLU.

The check valve 120 is disposed parallel to the first oil passageway switching valve 108 and the third oil passageway switching valve 118, between the output port SL4b of the linear solenoid valve SL4 and the brake B3 in the hydraulic control circuit 98. The check valve 120 includes an orifice 120a disposed on the brake B3 side, and a check ball 120b which is disposed on the output port SL4b side and whose diameter is larger than the opening diameter of the orifice 120a. With this construction, the check valve 120 permits the pressure oil to flow from the brake B3 side to the output port SL4b side while blocking the flow in the opposite direction.

Figure 6:
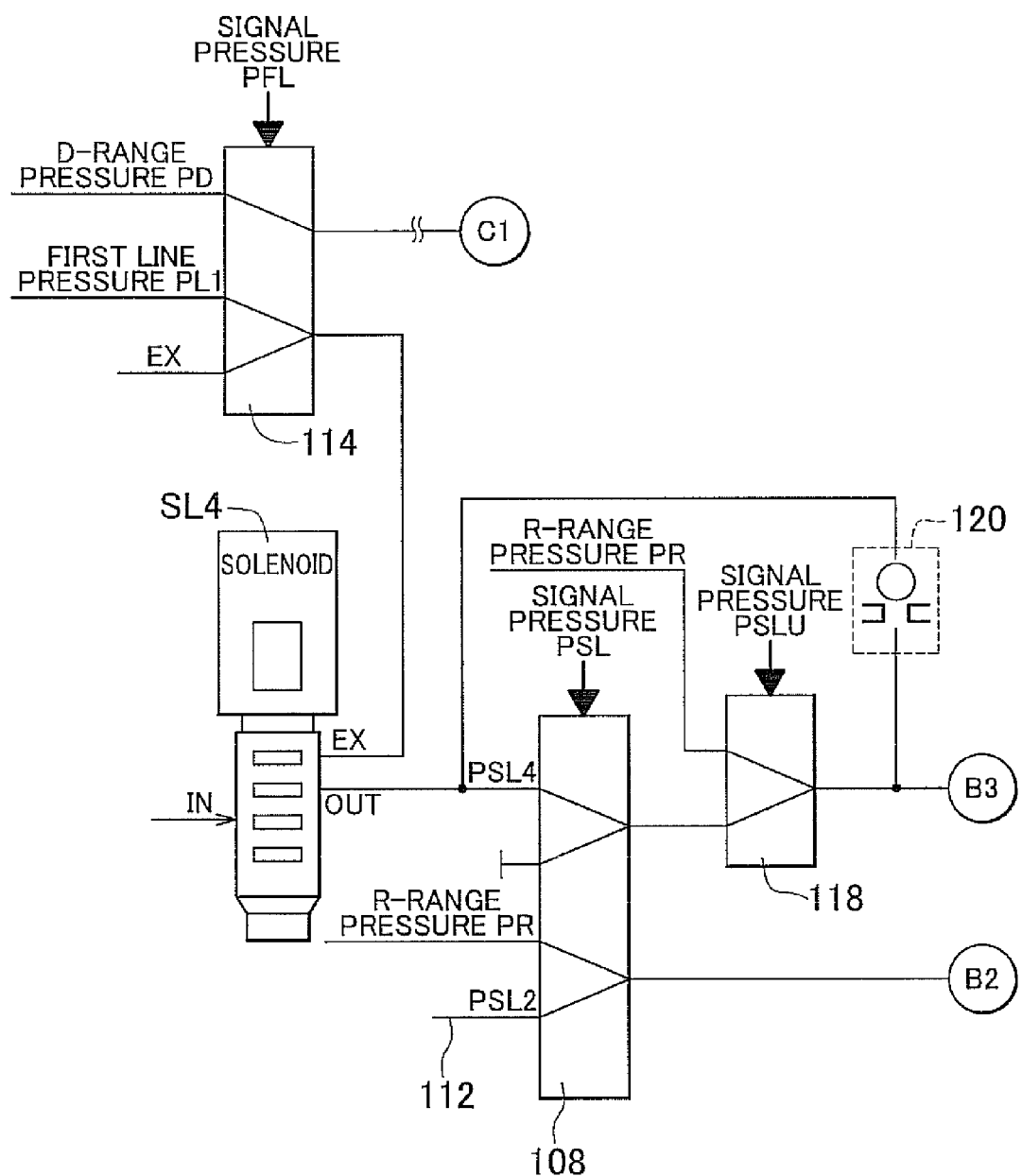
FIG. 6 is a diagram in which the hydraulic control circuit portions concerned with the invention are shown in a symbolized fashion that facilitates the understanding.

The foregoing construction of the hydraulic control circuit 98 is shown in FIG. 6 in a symbolized fashion that facilitates the understanding, with regard to main portions of the hydraulic control circuit 98. In the hydraulic control circuit 98 constructed as described above, the first oil passageway switching valve 108 is switched to the first position ap1 by the electronic control unit 90 when the brake B3 is engaged and the brake B2 is released, concretely, when the third-speed gear step or the fifth-speed gear step of the automatic transmission 10 is established. Furthermore, even when a forward-travel gear step (forward-travel speed change step) other than the third and fifth speed gear steps is established, the first oil passageway switching valve 108 is switched to the first position ap1 as long as the selector device 46 has been operated to the forward-travel position "D", "4", "3", "2" or "L", that is, as long as the speed change step of the automatic transmission 10 is a forward-travel speed change step. Besides, the first oil passageway switching valve 108 may also be switched to the first position ap1 when the selector device 46 has been operated to a non-travel position "P" or "N".

Besides, the first oil passageway switching valve 108 is switched to the second position ap2 when the speed change step of the automatic transmission 10 is the reverse-travel speed change step. For the reverse-travel speed change step of the automatic transmission 10, the brake B2 and the brake B3 are both engaged as shown in the engagement operation table of FIG. 2. The engagement of the brake B3 will be described in detail. During the progress of the engaging operation of the brake B3 from the released state, the output oil pressure PSL4 of the linear solenoid valve SL4 is supplied to the brake B3. After the brake B3 is fully engaged, the first oil passageway switching valve 108 is switched from the first position ap1 to the second position ap2, and the third oil passageway switching valve 118 is switched from the on-position cpon to the off-position cpoff. That is, the brake B3 is controlled so as to be engaged by the output oil pressure PSL4 during the progress of the engaging operation. After the brake is fully engaged, the engaged state thereof is maintained by the R-range pressure PR. Incidentally, the brake B2 is engaged by the output oil pressure PSL2 of the linear solenoid valve SL2 in the case where the speed change step of the automatic transmission 10 is the reverse-travel speed change step and where the first oil passageway switching valve 108 is switched to the second position ap2. Besides, the third oil passageway switching valve 118 is switched to the on-position cpon when any one of the first to sixth speed gear steps for the forward travel of the vehicle is to be established. Besides, in the case where after the brake B3 is fully engaged, the third oil passageway switching valve 118 is switched from the on-position cpon to the off-position cpoff, the first oil passageway switching valve 108 may be in the first position ap1. In such a manner, after the brake B3 is fully engaged, the engaged states of the brake B2 and the brake B3 are maintained by the R-range pressure PR. Besides, it suffices that the third oil passageway switching valve 118 supplies the R-range pressure PR to the brake B3 when the first oil passageway switching valve 108 disconnects the output port SL4b of the linear solenoid valve SL4 and the first communication passageway 110 from each other in the case where the reverse-travel speed change step of the automatic transmission 10 is to be established. No particular problem is caused if it is not after the full engagement of the brake B when the R-range pressure PR is supplied. However, the R-range pressure PR may also be supplied to the brake B3 after the full engagement of the brake B3 as described above. That is because if the supply of the R-range pressure PR is excessively earlier than the full engagement of the brake B3, engagement shock of the brake B3 is likely to occur.

Figure 7:
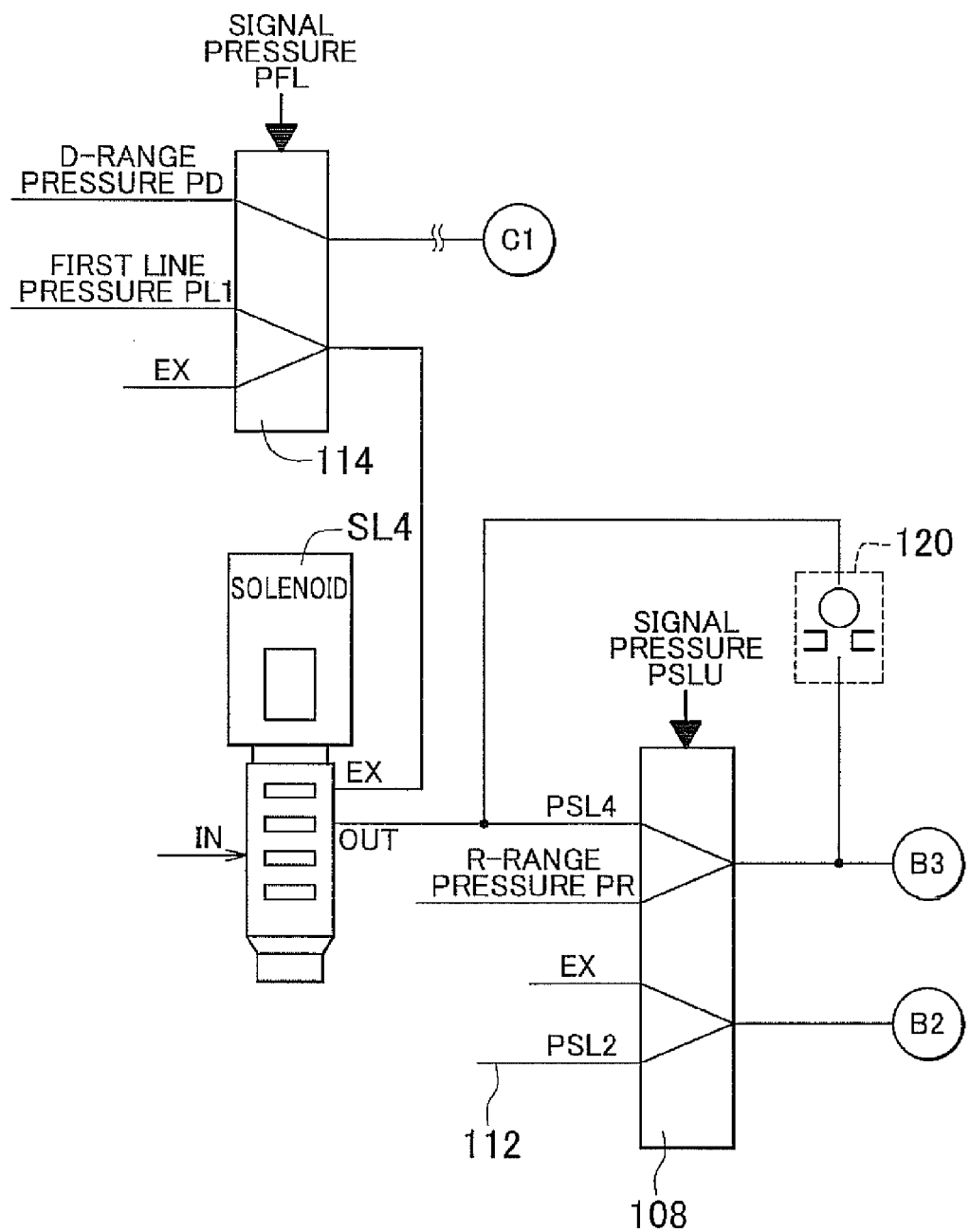
FIG. 7 is a diagram that corresponds to the diagram of FIG. 6, showing an example of the construction of another hydraulic control circuit that is obtained by eliminating the third oil passageway switching valve from the hydraulic control circuit show in FIG. 6.

Besides, as a hydraulic control circuit 98 that supplies the R-range pressure PR to the brake B3 when the first oil passageway switching valve 108 disconnects the output port SL4b of the linear solenoid valve SL4 and the first communication passageway 110 from each other, it is also possible to conceive a construction without the third oil passageway switching valve 118 as shown in FIG. 7. That is, while it has been described above that the first oil passageway switching valve 108, when in the second position ap2, blocks its port that is connected to the first communication passageway 110 that leads to the brake B3 as shown in FIG. 5, the first oil passageway switching valve 108, when in the second position ap2, may also supply the R-range pressure PR to the brake B3 while disconnecting the output port SL4b of the linear solenoid valve SL4 and the brake B3 from each other as shown in FIG. 7.

As described above, in some cases, the brake B3 is engaged while the first oil passageway switching valve 108 has been switched to the second position ap2. In such cases, if the output oil pressure PSL4 of the linear solenoid valve SL4 becomes less than the engagement oil pressure PB3 of the brake B3, the check valve 120 permits the pressure oil to flow from the brake B3 side to the side of the output port SL4*b* of the linear solenoid valve SL4, so that there is a risk of decline of the engagement oil pressure PB3 of the brake B3. Therefore, in the case where the brake B3 is engaged while the first oil passageway switching valve 108 has been switched to the second position ap2 or while the third oil passageway switching valve 118 has been switched to the off-position cpoff, that is, in the case where the output oil pressure PSL4 of the linear solenoid valve SL4 is not supplied to the brake B3, the second oil passageway switching valve 114 is switched to the on-position bpon, so that the oil pressure at the drain port SL4*d* of the linear solenoid valve SL4 is brought to the first line pressure PL1. Due to this, the pressure oil causing the engaged state of the brake B3 is prevented from being discharged from the drain port SL4*d* via the check valve 120. Thus, since the oil pressure that acts at the drain port SL4*d* is brought to the first line pressure PL1, decline of the engagement force of the brake B3 is prevented. However, in combination with the switching of the second oil passageway switching valve 114 to the on-position bpon, the linear solenoid valve SL4 may cause communication between the output port SL4*b* and the input port SL4*a* in the case where the brake B3 is engaged while the first oil passageway switching valve 108 has been switched to the second position ap2 or while the third oil passageway switching valve 118 has been switched to the off-position cpoff, that is, in the case where the output oil pressure PSL4 of the linear solenoid valve SL4 side is not supplied to the brake B3. In this construction, the flow of the pressure oil from the brake B3 side to the output port SL4*b* side via the check valve 120 is prevented, as in the above-described construction.

The hydraulic control circuit 98 is equipped with a so-called limp home function of establishing a speed change step for forward travel in the case where the selector device 46 is operated to the forward-travel position "D" during a failed state of the automatic transmission 10. In this embodiment, the speed change step for forward travel is the third-speed gear step. In the case where the selector device 46 is operated to the forward-travel position "D" during the failed state of the automatic transmission 10, the hydraulic control circuit 98 engages the brake B3 and the clutch C1 to establish the third-speed gear step. More concretely, while the automatic transmission 10 has failed, the first oil passageway switching valve 108 is switched to the first position ap1, and the second oil passageway switching valve 114 is switched to the on-position bpon, so that the second oil passageway switching valve 114 causes the oil pressure at the drain port SL4*d* of the first oil passageway switching valve 108 to be equal to the first line pressure PL1. At this time, since the linear solenoid valve SL4 is in the non-operating state (non-excited state), the output port SL4*b* and the drain port SL4*d* are interconnected, and the first line pressure PL1 is supplied to the brake B3, and engages the brake B3. Besides, at the time of failure of the automatic transmission 10, the second oil passage switching valve 114, when in the on-position bpon, that is, a position that causes the oil pressure at the drain port SL4*d* to be equal to the first line pressure PL1, supplies the D-range pressure PD to the clutch C1 via a second communication passageway 116. Therefore, as the selector device 46 is operated to the forward-travel position "D", the clutch C1 is engaged by the D-range pressure PD. In this manner, the foregoing limp home function is performed.

Figure 8:
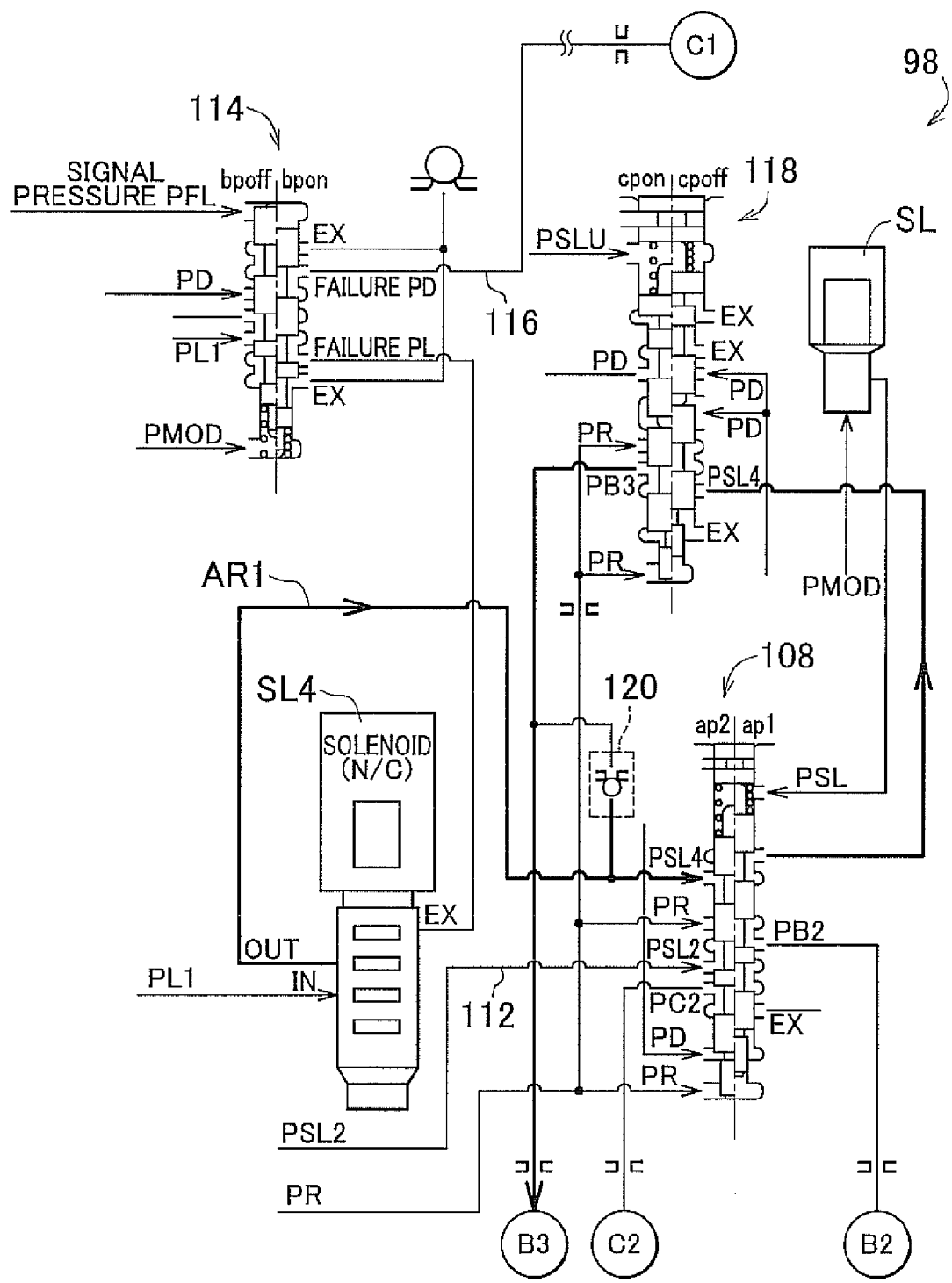
FIG. 8 is a diagram illustrating flow of the pressure oil in the case where the brake B3 is engaged in the hydraulic control circuit shown in FIG. 5.
Figure 9:
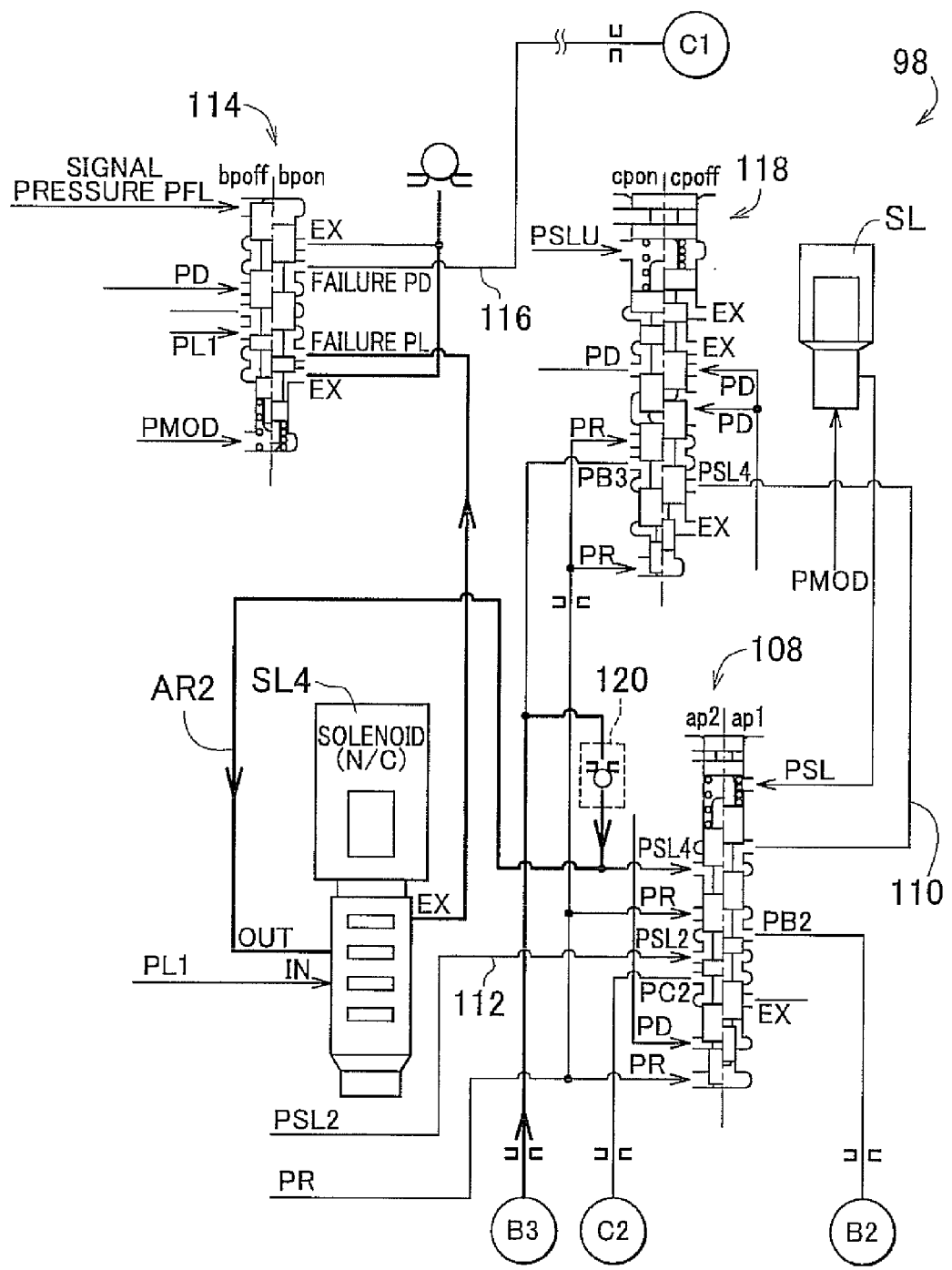
FIG. 9 is a diagram illustrating flow of the pressure oil in the case where the brake B3 is released in the hydraulic control circuit shown in FIG. 5.

This embodiment has the following effects (A1) to (A11). (A1) According to the embodiment, the linear solenoid valve (engagement pressure regulating valve) SL4 is supplied, at its input port SL4*a*, with the first line pressure (engagement basic pressure) PL1, and continuously changes the oil pressure at the output port SL4*b*. Besides, the first oil passageway switching valve 108 is selectively switched between the first position ap1 in which the valve 108 connects the output port SL4*b* and the brake B3 (first engagement element) to each other, and disconnects the brake B2 (second engagement element) and the oil pressure supply passageway 112 leading to the brake B2 from each other, and the second position ap2 in which the valve 108 disconnects the output port SL4*b* and the brake B3 (first engagement element) from each other, and interconnects the brake B2 and the oil pressure supply passageway 112. Besides, the check valve 120 provided parallel to the first oil passageway switching valve 108, between the output port SL4*b* and the brake B3, permits the pressure oil to flow from the brake B3 side to the output port SL4*b* side while blocking the flow in the opposite direction. The first oil passageway switching valve 108 is switched to the first position ap1 when the brake B3 is engaged and the brake B2 is released. Therefore, in the case where the brake B3 is engaged by the output oil pressure PSL4 of the linear solenoid valve SL4 through the control of the linear solenoid valve SL4, the flow of the pressure oil is as shown by thick solid arrowed lines AR1 in FIG. 8. Besides, the flow of the pressure oil in the case where the brake B3 is released is as shown by thick solid arrowed lines AR2 in FIG. 9. That is, the pressure oil is supplied to the output port SL4*b* of the linear solenoid valve SL4, not via the first oil passageway switching valve 108, but via the check valve 120. Therefore, the engagement oil pressure PB3 of the brake B3 can be controlled by the linear solenoid valve SL4, not only when the brake B3 is engaged but also when the brake B3 is released. Furthermore, at the time of release of the brake B3, the position of the first oil passageway switching valve 108 is not restricted. Specifically, irrespective of which one of the positions the first oil passageway switching valve 108 has been switched to, the releasing operation of the brake B3 can be caused by controlling the engagement oil pressure PB3 of the brake B3 through the use of the linear solenoid valve SL4. Due to this, the gear shift shock can be restrained, in comparison with the case where the engagement oil pressure PB3 is immediately changed to the foregoing drain pressure. In addition, in the foregoing embodiment, the first oil passageway switching valve 108 is switched to the first position ap1 when the brake B3 is engaged and the brake B2 is released. The first oil passageway switching valve 108 is sometimes switched to the first position ap1 in the case where both the brake B2 and the brake B3 are engaged. For example, in the case where the brake B2 and the brake B3 are both engaged in order to establish the reverse-travel speed change step as mentioned above, the first oil passageway switching valve 108 is switched to the first position ap1 in order to supply the output oil pressure PSL4 to the brake B3, before the brake B3 is fully engaged, that is, while the engaging operation of the brake B3 is in progress. At that time, the first oil passageway switching valve 108, being in the first position ap1, supplies the R-range pressure PR to the brake B2, so that the brake B2 is engaged.

(A2) When the first oil passageway switching valve 108 is in the first position ap1, the brake B3 can be engaged by the output oil pressure PSL4 of the linear solenoid valve SL4, but the brake B2 cannot be engaged by the output oil pressure PSL2 of the linear solenoid valve SL2. On the other hand, when the first oil passageway switching valve 108 is in the second position ap2, the brake B3 cannot be engaged by the output oil pressure PSL4, but the brake B2 can be engaged by the output oil pressure PSL2. Due to this construction of the first oil passageway switching valve 108, it is possible to prevent an incident in which the brake B2 and the brake B3 are simultaneously engaged and therefore the corresponding reverse-travel speed change step is established as a result of a failure of the automatic transmission 10, for example, a malfunction of the linear solenoid valve SL2 or SL4, or the like. That is, the first oil passageway switching valve 108 has a function of prohibiting the simultaneous engagement of the brake B2 and of the brake B3 unless the selector device 46 is operated to the reverse-travel position "R".

Figure 10:
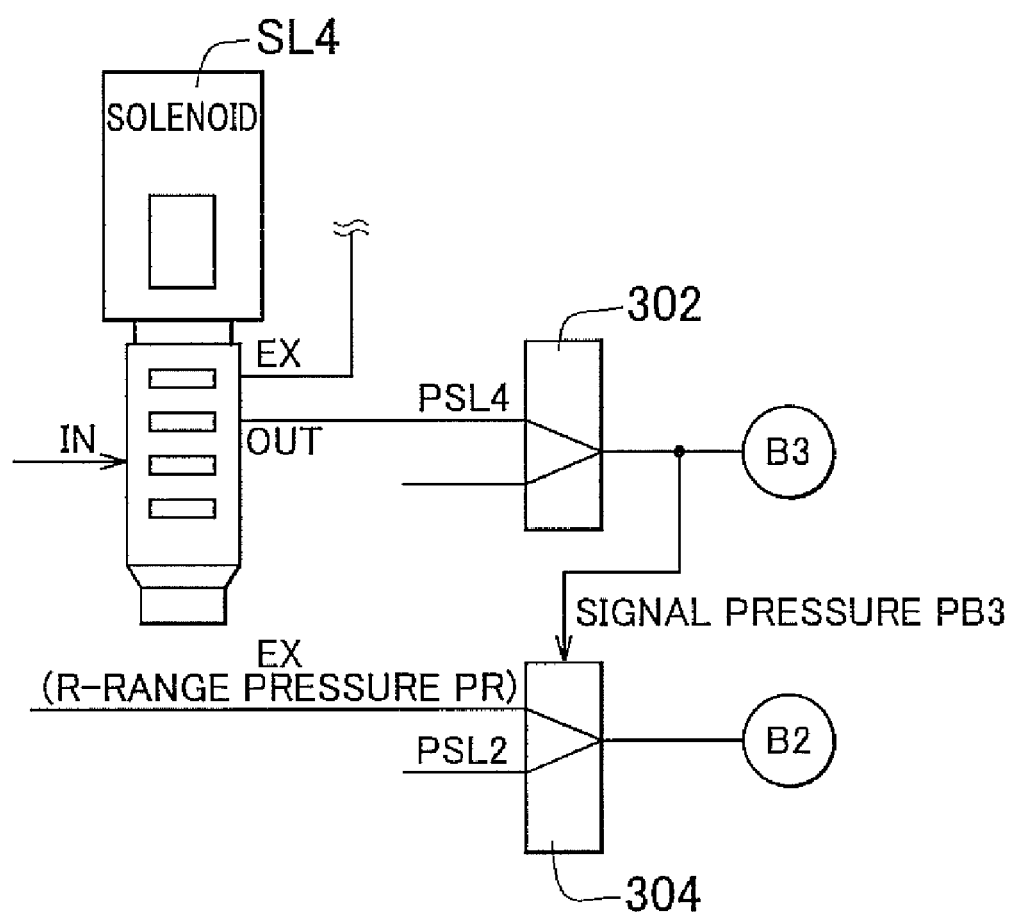
FIG. 10 is a diagram showing an example of a valve construction that is different from the valve construction of the invention, and is provided for illustrating an advantage of the invention allowing a size reduction of the valve construction, through comparison between the construction shown in FIG. 10 and the construction of the invention shown in FIGS. 5 to 7.

(A3) The hydraulic control apparatus 100 in the embodiment is able to control the engagement oil pressure PB3 of the brake B3 by the linear solenoid valve SL4, not only when the brake B3 is engaged, but also when the brake B3 is released, as described above. Furthermore, the hydraulic control apparatus 100 also has the function of prohibiting the simultaneous engagement of the brake B2 and of the brake B3 unless that the selector device 46 is operated to the reverse-travel position "R". These two functions can also be realized by a valve construction as shown in FIG. 10. In the construction shown in FIG. 10, the first oil passageway switching valve 108 and the check valve 120 are not provided. Instead, the construction is provided with a first shutoff valve 302 that blocks the supply of the output oil pressure PSL4 to the brake B3 at the time of a failure of the linear solenoid valve SL4, or the like, and a second shutoff valve 304 that is supplied with the engagement oil pressure PB3 of the brake B3 as a signal pressure, and that blocks the supply of the output oil pressure PSL2 to the brake B2 when the brake B3 is engaged. In the valve construction as shown in FIG. 10, since the position of the first shutoff valve 302 is restricted in order to supply the output oil pressure PSL4 to the brake B3, not only when the brake B3 is engaged, but also when the brake B3 is released. Therefore, it is difficult to equip the first shutoff valve 302 with the function of prohibiting the simultaneous engagement. Therefore, to realize the function of prohibiting the simultaneous engagement, the second shutoff valve 304 is provided. Hence, in order to realize the function of supplying the output oil pressure PSL4 to the brake B3 both when the brake B3 is engaged and when the brake B3 is released, and the function of prohibiting the simultaneous engagement, the valve construction shown in FIG. 10 needs a total of two shutoff valves, that is, the first shutoff valve 302 and the second shutoff valve 304. On the other hand, the hydraulic control apparatus 100 of the foregoing embodiment is able to realize the foregoing two functions by a construction that includes the first oil passageway switching valve 108 and the check valve 120, since the first oil passageway switching valve 108 has the function of prohibiting the simultaneous engagement. That is, in the foregoing embodiment, the two functions can be realized by a valve construction that is less expensive and smaller in size than the valve construction shown in FIG. 10.

(A4) According to the embodiment, the input port SL4a of the linear solenoid valve SL4 is supplied with the first line pressure PL1, and the second oil passageway switching valve 114 provides the first line pressure PL1 as the oil pressure acting on the drain port SL4d of the linear solenoid valve SL4 in the case where the brake B3 is engaged while the first oil passageway switching valve 108 has been switched to the second position ap2. Therefore, regardless of the state of operation of the linear solenoid valve SL4, the output oil pressure PSL4 becomes equal to the first line pressure PL1, thus preventing an event in which the pressure oil causing the engaged state of the brake B3 is discharged via the check valve 120. Therefore, it is possible to prevent decline in the engagement force of the brake B3. Besides, the second oil passageway switching valve 114 is needed for the fail-safe function, that is, needed to realize the limp home function. Therefore, there is no need to newly provide a switching valve for the purpose of preventing an incident in which the pressure oil causing the engaged state of the brake B3 is discharged via the check valve 120, and the existing second oil passageway switching valve 114 can be equipped with a function of preventing decline of the engagement force of the brake B3.

(A5) Besides, according to the embodiment, when the automatic transmission 10 fails, the first oil passageway switching valve 108 is switched to the first position ap1, and the second oil passageway switching valve 114 is switched to the on-position bpon, so that the oil pressure acting on the drain port SL4d of the linear solenoid valve SL4 is brought to the first line pressure PL1 by the second oil passageway switching valve 114. Besides, the second oil passageway switching valve 114, when in the on-position bpon, supplies the D-range pressure PD to the clutch C1 via the second communication passageway 116. Therefore, at the time of failure of the automatic transmission 10, the third-speed gear step is established as the selector device 46 is operated to a forward-travel position, such as the forward-travel position "D" or the like. Therefore, even if the gear shift of the automatic transmission 10 that is performed at the time of non-failure, that is, at the time of normality, becomes impossible, the vehicle is still able to travel forward.

(A6) Besides, according to the embodiment, in the case where the brake B3 is engaged while the first oil passageway switching valve 108 has been switched to the second position ap2, the output port SL4b and the input port SL4a of the linear solenoid valve SL4 may be interconnected in communication. If so connected, it is still more certain that the output oil pressure PSL4 of the linear solenoid valve SL4 will be brought to the first line pressure PL1, so that the pressure oil causing the engagement of the brake B3 can be prevented from being discharged via the check valve 120, and therefore decline of the engagement force of the brake B3 can be prevented.

(A7) Besides, according to the embodiment, when the brake B3 is engaged and the brake B2 is released, the automatic transmission 10 establishes a speed change step for forward travel of the vehicle, concretely, the third-speed gear step or the fifth-speed gear step for forward travel. When both the brake B3 and the brake B2 are engaged, the reverse-travel speed change step is established. In the case where the speed change step of the automatic transmission 10 is any one of the forward-travel speed change steps, the first oil passageway switching valve 108 is switched to the first position apt, and performs the function of prohibiting the simultaneous engagement of the brake B2 and of the brake B3 except that the selector device 46 is operated to the reverse-travel position "R". Therefore, the speed change step of the automatic transmission 10 changing to the reverse-travel speed change step due to a failure of the automatic transmission 10 or the like can be mechanically prevented by the first oil passageway switching valve 108. Incidentally, the first oil passageway switching valve 108 is set in the first position ap1 while the engagement control of the brake B3 is in progress when the reverse-travel speed change step is established. After the engagement control is completed, the first oil passageway switching valve 108 is switched to the second position ap2

(A8) According to the embodiment, it is permissible to adopt a construction as shown in FIG. 7 in which the third oil passageway switching valve 118 is not provided, and the first oil passageway switching valve 108, when in the second position ap2, disconnects the output port SL4b of the linear solenoid valve SL4 and the brake B3 from each other, and supplies the R-range pressure PR to the brake B3. If, in that construction, the selector device 46 is operated to the reverse-travel position "R", then the brake B2 is engaged by the output oil pressure PSL2 from the oil pressure supply passageway 112, and the brake B3 is engaged due to the supply of the R-range pressure PR, so that the reverse-travel speed change step is established.

(A9) Bedsides, according to the embodiment, the third oil passageway switching valve 118 supplies the R-range pressure PR to the brake B3 in the case where the speed change step of the automatic transmission 10 is the reverse-travel speed change step. Therefore, in the case where the selector device 46 is operated to the reverse-travel position "R", the brake B3 is engaged due to the supply of the R-range pressure PR. Furthermore, in the case where the speed change step of the automatic transmission 10 is the reverse-travel speed change step, the first oil passageway switching valve 108 is switched to the second position ap2, so that the brake B2 is engaged by the output oil pressure PSL2 of the linear solenoid valve SL2. Due to the engagement of the brake B2 and the engagement of the brake B3, the reverse-travel speed change step is established. Thus, when the reverse-travel speed change step is to be established, the third oil passageway switching valve 118 supplies the R-range pressure PR to the brake B3, so that the position of the first oil passageway switching valve 108 is not restricted for the purpose of engaging the brake B3, and therefore the first oil passageway switching valve 108 can be switched to the second position ap2.

(A10) According to the embodiment, since the linear solenoid valve SL4 also serves to continuously change its output oil pressure PSL4 according to the drive current of the solenoid, the engagement oil pressure PB3 of the brake B3 can be directly controlled in an electric manner.

(A11) According to the embodiment, in the case where the brake B3 is engaged in order to establish the reverse-travel speed change step of the automatic transmission 10, the brake B3 is supplied with the output oil pressure PSL4 of the linear solenoid valve SL4 when the engaging operation of the brake B3 is in progress. After the brake B3 is fully engaged, the brake B3 is supplied with the R-range pressure PR, and is thereby kept in the engaged state. Therefore, the shift shock caused by the engagement of the brake B3 can be restrained. Besides, after the brake B3 is fully engaged, there is no need to control the linear solenoid valve SL4. Besides, the brake B3, after being fully engaged, is supplied with the R-range pressure PR, so that sufficient engagement force, that is, sufficient torque capacity, is secured.

While the embodiments of the invention have been described in detail with reference to the drawings, the foregoing embodiments are merely illustrative embodiments, and the invention can be carried out in various manners with modifications or improvements based on the knowledge of persons with ordinary skill in the art.

For example, although in the foregoing embodiments, the second oil passageway switching valve 114 is connected to the drain port SL4d of the linear solenoid valve SL4, it is also conceivable to adopt a hydraulic control circuit in which the second oil passageway switching valve 114 is not provided, and the drain port SL4d is provided with the drain pressure. If, in that construction, the brake B3 is engaged while the first oil passageway switching valve 108 has been switched to the second position ap2, the linear solenoid valve SL4 interconnects the output port SL4b and the input port SL4a in order to prevent the pressure oil from flowing from the brake B3 side to the output port SL4b side via the check valve 120.

Besides, although in the foregoing embodiments, the linear solenoid valves SL1 to SL4 continuously change their respective output oil pressures PSL1 to PSL4 according to the drive current of their solenoids, it is also permissible to adopt a construction in which the output oil pressures PSL1 to PSL4 are not controlled on the basis of electric current; for example, the linear solenoid valves SL1 to SL4 may be replaced by pressure control valves whose output oil pressures are controlled according to a pilot pressure.

Besides, although in the foregoing embodiments, each of the first oil passageway switching valve 108, the second oil passageway switching valve 114 and the third oil passageway switching valve 118 is switched in valve position according to the pilot pressure, each of the valves may also be an electromagnetic valve that is equipped with a solenoid and is switched in valve position according to the excitation/non-excitation of the solenoid.

Besides, although in the foregoing embodiments, the check valve 120 includes the orifice 120a and the check ball 120b, the check valve 120 is not limited to that construction.

Besides, although in the foregoing embodiments, the first line pressure PL1 is an oil pressure that is obtained by regulating, through the use of the first line pressure regulating valve, the pressure of the working fluid that is pressure-fed from the oil pump, it is also permissible that the working fluid is not regulated in pressure by the first line pressure regulating valve. Besides, although in FIG. 5, the first line pressure PL1 is supplied to a plurality of sites, it is not necessary that all the sits have the same pressure.

Besides, although in the foregoing embodiments, the predetermined speed change step for the forward travel of the vehicle in the invention correspond to two gear steps, that is, the third-speed gear step "3rd" and the fifth-speed gear step "5", it is also possible that a single gear step may also correspond, or three or more gear steps may correspond to the predetermined speed change step.

Besides, in the foregoing embodiments, the hydraulic control circuit 98 establishes the third-speed gear step in the case where the selector device 46 is operated to the forward-travel position "D", during the failed state of the automatic transmission 10. However, other processes for a failure may also be performed.

What is claimed is:

1. A hydraulic control apparatus for a vehicle automatic transmission that includes a first engagement element and a second engagement element that are released or engaged through hydraulic control in order to switch speed change steps, comprising:
    an engagement pressure regulating valve whose input port is supplied with engagement basic pressure for engaging the first engagement element, and which continuously changes oil pressure of an output port of the engagement pressure regulating valve;
    a first oil passageway switching valve that is selectively switched between a first position in which the first oil passageway switching valve connects the output port of the engagement pressure regulating valve and the first engagement element to each other, and disconnects the second engagement element and an oil pressure supply passageway to the second engagement element from each other, and a second position in which the first oil passageway switching valve disconnects the output port of the engagement pressure regulating valve and the first engagement element from each other, and interconnects the second engagement element and the oil pressure supply passageway; and
    a check valve that is provided parallel to the first oil passageway switching valve, between the output port of the engagement pressure regulating valve and the first engagement element, and that permits pressure oil to flow in a direction from a side of the first engagement element to a side of the output port, and prevents the pressure oil from flowing in a direction opposite to the direction from the side of the first engagement element to the side of the output port, wherein the first oil passageway switching valve is switched to the first position when the first engagement element is engaged and the second engagement element is released.

2. The hydraulic control apparatus according to claim 1, wherein:

the engagement pressure regulating valve disconnects the output port and the input port from each other and interconnects the output port and a drain port of the engagement pressure regulating valve when the engagement pressure regulating valve is not operated;

the hydraulic control apparatus is provided with a second oil passageway switching valve that selectively switches oil pressure acting at the drain port between the engagement basic pressure and a drain pressure at which the first engagement element is released;

when the vehicle automatic transmission fails, the first oil passageway switching valve is switched to the first position, and the oil pressure at the drain port is made equal the engagement basic pressure by the second oil passageway switching valve, so that the first engagement element is engaged; and the second oil passageway switching valve causes the oil pressure acting at the drain port to be equal to the engagement basic pressure when the first engagement element is engaged while the first oil passageway switching valve has been switched to the second position.

3. The hydraulic control apparatus according to claim 2, wherein:

the vehicle automatic transmission includes a third engagement element that is released or engaged by an oil pressure control in order to switch the speed change steps, and establishes a speed change step for forward travel when both the first engagement element and the third engagement element are engaged; and at a time of failure of the vehicle automatic transmission, the second oil passageway switching valve supplies the third engagement element with a D-range pressure that becomes equal to the engagement basic pressure when a selector device is operated to a forward-travel position, while the second oil passageway switching valve is in the position that causes the oil pressure acting at the drain port to be equal to the engagement basic pressure.

4. The hydraulic control apparatus according to claim 1, wherein the engagement pressure regulating valve interconnects the output port and the input port when the first engagement element is engaged while the first oil passageway switching valve has been switched to the second position.

5. The hydraulic control apparatus according to claim 2, wherein: the vehicle automatic transmission establishes a predetermined speed change step for forward travel when the first engagement element is engaged and the second engagement element is released, and establishes a reverse-travel speed change step when both the first engagement element and the second engagement element are engaged; and the first oil passageway switching valve is switched to the first position when the speed change step of the vehicle automatic transmission is a forward-travel speed change step.

6. The hydraulic control apparatus according to claim 5, wherein the first oil passageway switching valve, when in the second position, supplies the first engagement element with a reverse-travel range pressure that becomes equal to the engagement basic pressure when a selector device is operated to a reverse-travel position.

7. The hydraulic control apparatus according to claim 5, wherein:

a third oil passageway switching valve that supplies the first engagement element selectively with the oil pressure from the first oil passageway switching valve or a reverse-travel range pressure that becomes equal to the engagement basic pressure when a selector device is operated to a reverse-travel position is provided between the first engagement element and the first oil passageway switching valve; and the third oil passageway switching valve supplies the reverse-travel range pressure to the first engagement element when the speed change step of the vehicle automatic transmission is the reverse-travel speed change step.

8. The hydraulic control apparatus according to claim 1, wherein the engagement pressure regulating valve is a linear solenoid valve.

* * * * *

UNITED STATES PATENT AND TRADEMARK OFFICE
CERTIFICATE OF CORRECTION

| | |
|---|---|
| PATENT NO. | : 8,088,039 B2 |
| APPLICATION NO. | : 12/652284 |
| DATED | : January 3, 2012 |
| INVENTOR(S) | : Akiko Nishimine et al. |

It is certified that error appears in the above-identified patent and that said Letters Patent is hereby corrected as shown below:

At column 18, line number 46 delete "apt" and insert --ap1--.

Signed and Sealed this
Sixth Day of November, 2012

David J. Kappos
*Director of the United States Patent and Trademark Office*